(12) United States Patent
Dallapiccola et al.

(10) Patent No.: US 12,480,571 B2
(45) Date of Patent: Nov. 25, 2025

(54) LUBRICANT SYSTEM INCLUDING A BAFFLE

(71) Applicant: DANA ITALIA S.R.L., Trentino (IT)

(72) Inventors: Matteo Dallapiccola, Trento (IT); Pier Paolo Rinaldi, Arco (IT); Mark Slater, Warwickshire (GB)

(73) Assignee: DANA ITALIA S.R.L., Arco (IT)

( * ) Notice: Subject to any disclaimer, the term of this patent is extended or adjusted under 35 U.S.C. 154(b) by 68 days.

(21) Appl. No.: 18/541,703

(22) Filed: Dec. 15, 2023

(65) Prior Publication Data

US 2025/0198501 A1    Jun. 19, 2025

(51) Int. Cl.
*F16H 57/04* (2010.01)

(52) U.S. Cl.
CPC ..... *F16H 57/0427* (2013.01); *F16H 57/0423* (2013.01); *F16H 57/0424* (2013.01); *F16H 57/045* (2013.01)

(58) Field of Classification Search
CPC .......... F16H 57/0427; F16H 57/0409
See application file for complete search history.

(56) References Cited

U.S. PATENT DOCUMENTS

| | | | |
|---|---|---|---|
| 5,505,112 A * | 4/1996 | Gee | F16H 57/0447 184/6.12 |
| 9,568,091 B2 | 2/2017 | Drill et al. | |
| 10,167,944 B2 | 1/2019 | Kwasniewski et al. | |
| 11,181,184 B2 | 11/2021 | Base | |
| 2008/0128212 A1 | 6/2008 | Utzat et al. | |
| 2018/0058569 A1 | 3/2018 | Slayter et al. | |
| 2020/0103018 A1 | 4/2020 | Base | |
| 2020/0325979 A1 | 10/2020 | Gravina et al. | |
| 2022/0003135 A1 * | 1/2022 | Rinaldi | F16H 57/0457 |

FOREIGN PATENT DOCUMENTS

| | | | | |
|---|---|---|---|---|
| CN | 102840312 | A | 12/2012 | |
| CN | 111486223 | A | 8/2020 | |
| CN | 211175271 | U | 8/2020 | |
| CN | 211624265 | U | 10/2020 | |
| CN | 116025691 | A | 4/2023 | |
| DE | 2755129 | A1 | 6/1979 | |
| EP | 3018386 | A1 * | 5/2016 | ......... F16H 57/0423 |
| EP | 3660354 | A1 * | 6/2020 | ........... F16H 3/0915 |
| JP | 2020085145 | A * | 6/2020 | ......... F16H 3/0915 |
| WO | WO-2014108250 | A1 * | 7/2014 | ......... F16H 57/0423 |

OTHER PUBLICATIONS

USPTO Machine Translation (retrieved by FIT database) of the Description of JP 2020085145 A, Tagawa et al., Jun. 4, 2020. (Year: 2025).*
Dallapiccola, M. et al., "Systems for Lubrication Distribution," U.S. Appl. No. 18/066,153, filed Dec. 14, 2022, 29 pages.
Comodi, P. et al., "Adjustable Distribution Plate for an Axial Piston Assembly," U.S. Appl. No. 18/296,320, filed Apr. 5, 2023, 37 pages.

* cited by examiner

Primary Examiner — Daniel D Yabut
(74) Attorney, Agent, or Firm — McCoy Russell LLP

(57) ABSTRACT

A gearbox including: a fixed housing; a first wheel housed in the fixed housing; a second wheel housed in the fixed housing; a duct, where the duct is fixed to the gearbox; and a baffle interposed between the first wheel and the second wheel, wherein the duct is configured to transport a fluid to the first wheel, wherein the baffle is configured to transport fluid from the first wheel to the second wheel, and wherein the baffle is fixed to the fixed housing.

16 Claims, 5 Drawing Sheets

LUBRICANT SYSTEM INCLUDING A BAFFLE

TECHNICAL FIELD

The present description relates to a lubricant distribution system including baffle that distributes lubricant passively.

BACKGROUND AND SUMMARY

Vehicles, such as electrified vehicles, may have a transmission to switch between sets of wheels or wheel like components of different ratios, where sets of different ratios produce different output torques and rotational speeds with the same input torque. The transmission may house at least one wheel set, which may include wheels or wheel-like components. Each wheel may be supported by and rotationally coupled to a shaft or another rotational element, such as to receive torque from or output torque to the shaft or other rotational element. The wheel set may include at least a first wheel and a second wheel. The components of the wheel set, including a first wheel and a second wheel, are lubricated to reduce friction, mitigate temperature increases or decreases, prevent locking, and prevent degradation. The wheel set may be lubricated via a work fluid, such as oil. The wheel set may transport work fluid passively to other components of the transmission, such as via dripping and/or splashing. The wheel set may be a gear set, where each of the wheels or wheel like components may be gears; the first wheel and second wheel may be a first gear and a second gear, respectively. However, it is to be appreciated that the wheel set may be another type of a wheel set, such as a belt and pulley set.

For an example, the first wheel and second wheel may be lubricated passively. The first wheel may dip into a sump of work fluid, where dipping coats and lubricates the first wheel via the work fluid. The first wheel may splash work fluid to the second wheel and to other components of the transmission, such as when the first wheel is rotated. Work fluid splashed onto components of the transmission may lubricate those components. However, dipping the wheel set into work fluid and splashing of work fluid may result in power loss to rotational elements of the transmission, including the first wheel. Additionally, more work fluid may be used through dipping and splashing compared to more targeted means of work fluid distribution, such as spraying via sprayers. The increased work fluid for lubrication may increase the volume of the sump and by extension the transmission. For another example, a sprayer or a plurality of sprayers may be used to apply lubricant via targeted spraying to the lowest wheel or a plurality of wheels of the wheel set. However, the use of a sprayer increases the complexity of the system which may increase degradation to the sprayers or other moving components. The sprayer also uses pressure and/or another form of non-passive power to lubricate a wheel. Likewise, the transmission may not have the packing space enclosed by the transmission housing for the sprayer or the plurality of sprayers.

The inventors herein have recognized these and other issues with such gear lubrication systems and have come up with a way to at least partially solve them. In one example, a transmission includes a gearbox comprising: a fixed housing; a first wheel; a second wheel; a duct, where the duct is fixed; and a baffle, wherein the baffle is interposed between the first wheel and second wheel, where the duct transports a fluid to the first gear, the baffle transports fluid from the first wheel to the second wheel, and the baffle is fixed to the fixed housing.

In this way, the baffle may enable a passive distribution of oil between the first wheel and the second wheel. In some examples, the baffle may remove and collect work fluid from an undercut groove of the first wheel, such as when the first wheel is rotating. The baffle may direct the work fluid toward the second wheel. The baffle may be stationary, thereby reduce moving parts and complexity of the system. The baffle may be mounted via a snap fit or a snap in configuration, allowing for easy installation. Both the duct and the baffle may reduce the amount of work fluid used, as the duct may enable targeted transport of work fluid to the first wheel from the sump, and the baffle may enable targeted transport of work fluid to the second wheel from the first wheel. A plurality of baffles may be used to fluidly couple a series of wheels, where each baffle transports fluid from a lower wheel to an upper wheel.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
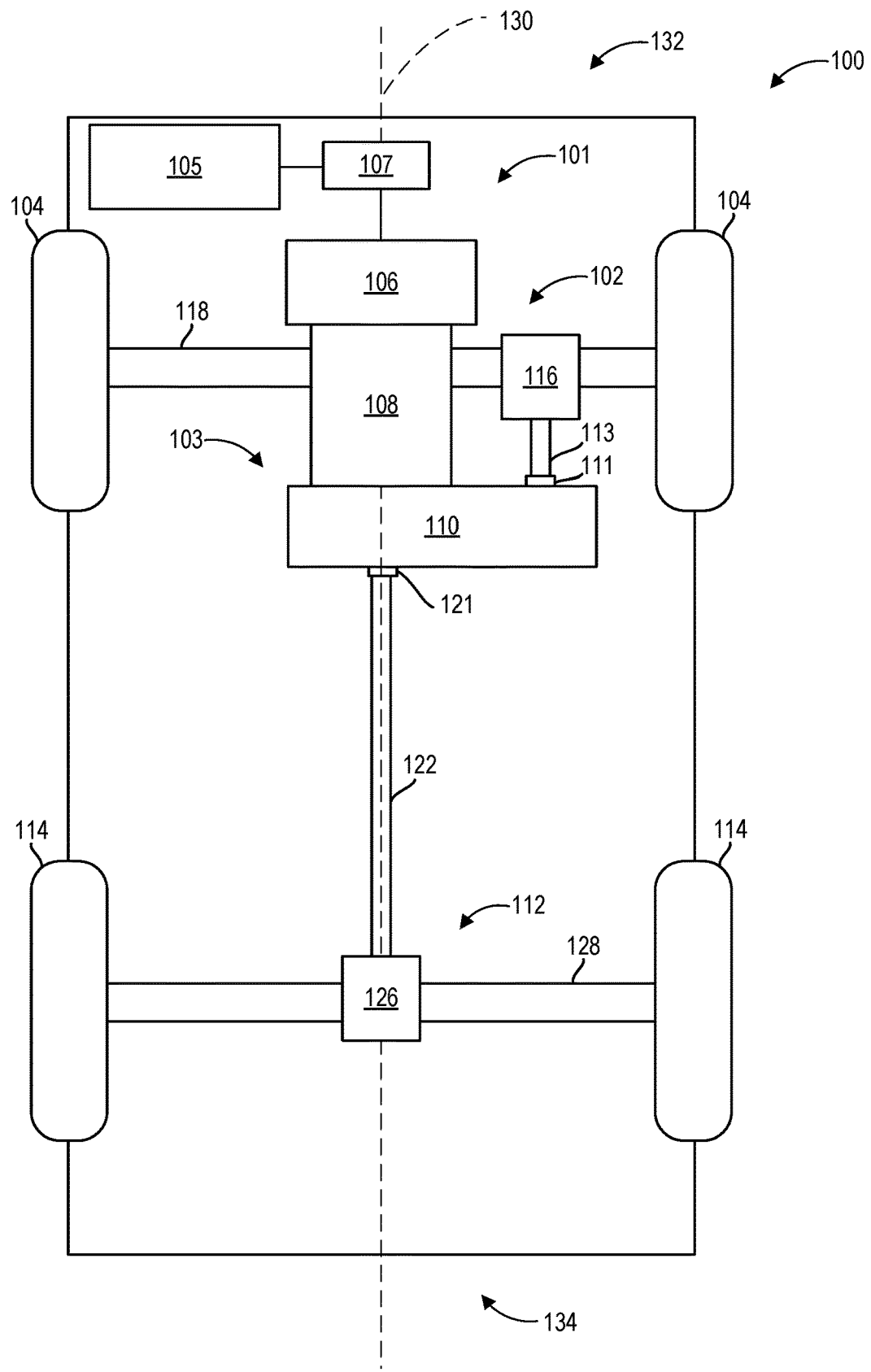
FIG. 1 shows an example schematic of a vehicle which may include a transmission of the present disclosure.

The following description relates to a lubricant distribution system for a wheel set of a transmission. The transmission may be a simple transmission with at least a wheel set including at least two wheels: a first wheel and a second wheel. The transmission may include a first reservoir and a second reservoir. A barrier, such as a septum, may separate the first reservoir from the second reservoir. The first reservoir and second reservoir may be fluidly coupled via a duct. The first reservoir may be a calm reservoir trapping work fluid and lubricant, such as oil. The second reservoir may house at least a wheel of the wheel set. Work fluid housed by the second reservoir may have a surface low enough not to make surface sharing contact with a wheel of the wheel sets. The duct may direct work fluid from the first reservoir to a targeted position on a wheel, such as the first wheel.

The first wheel may be positioned below the second wheel. The wheels of the wheel set may each have an undercut groove, where the first wheel has a first undercut groove and the second wheel has a second undercut groove. The duct may direct work fluid to be deposited on the surface of an undercut groove of a wheel, such as the first undercut groove of the first wheel. The first wheel and second wheel may each be positioned about and rotationally coupled to shafts, such as a first shaft and a second shaft, respectively. The shafts complementary to the first wheel and second wheel may be supported via bearings. The bearings may be positioned around or about the shafts, such as to encircle the shafts. The shafts may drive the first wheel and second wheel to rotate. Additionally or alternatively, the first wheel and second wheel may be driven by other rotational elements that are rotatably coupled to the first wheel and second wheel. The rotation of a wheel may drive work fluid on a surface of the undercut groove of the wheel radially outward and about the under groove. Centripetal force may drive the work fluid deposited in the first undercut groove to coat the first undercut groove and inner surfaces of the first wheel. The transmission may have a fixed baffle positioned between the first wheel and second wheel, such that the first wheel and second wheel may rotate while the baffle remains stationary. The baffle may be fixed via a snap fit or a snap in with a component of the transmission that is stationary relative to the rotational elements, such as the housing of the transmission. The baffle may collect work fluid passively from the first undercut groove of the first wheel. The baffle may direct the work fluid collected from the first wheel to the second undercut groove of the second wheel. The centripetal force from the rotation of the second wheel may drive work fluid to coat the second undercut groove and surfaces of the second wheel. Work fluid may be splashed via centripetal force or dripped from a wheel to other components, such as for lubrication.

The baffle may comprise wings, at least three appendages, and a shoulder. The three appendages may be connected to and extend from the shoulder. The three appendages include at least two deflectors and a lip. The wings may reach toward and couple the baffle to fixed points of the transmission. There may be at least a pair of wings. The wings may fix the baffle to a feature of the transmission, such as the housing. For an example the wings may abut and mount to a feature of the transmission such as via a snap fit or a snap in. The two deflectors may capture lubricant from the first wheel. The lip may transport lubricant from the two deflectors to the second wheel, such as the second undercut groove of the second wheel.

For an example, the first wheel may be a final drive wheel and the second wheel may be an intermediate wheel. The wheels of the transmission, including the first wheel and second wheel, may be gears. As gears, the first wheel and second wheel may mesh and transfer torque to other rotational elements such as gears. As gears, the first wheel and second wheel may each be part of a separate gear set, where the first wheel may mesh with a gear of a first gear set that is not the second wheel and the second wheel may mesh with a gear of a second gear set that is not the first wheel.

It is to be appreciated that the transmission is non-limiting and there may be more than two wheels of a wheel set and that the transmission may include a plurality of wheel sets. A plurality of baffles may be used, with each baffle being positioned between a pair of wheels of a plurality of wheels. Each of the baffles may direct work fluid from a lower wheel to a higher wheel of the pair of wheels.

Figure 2:
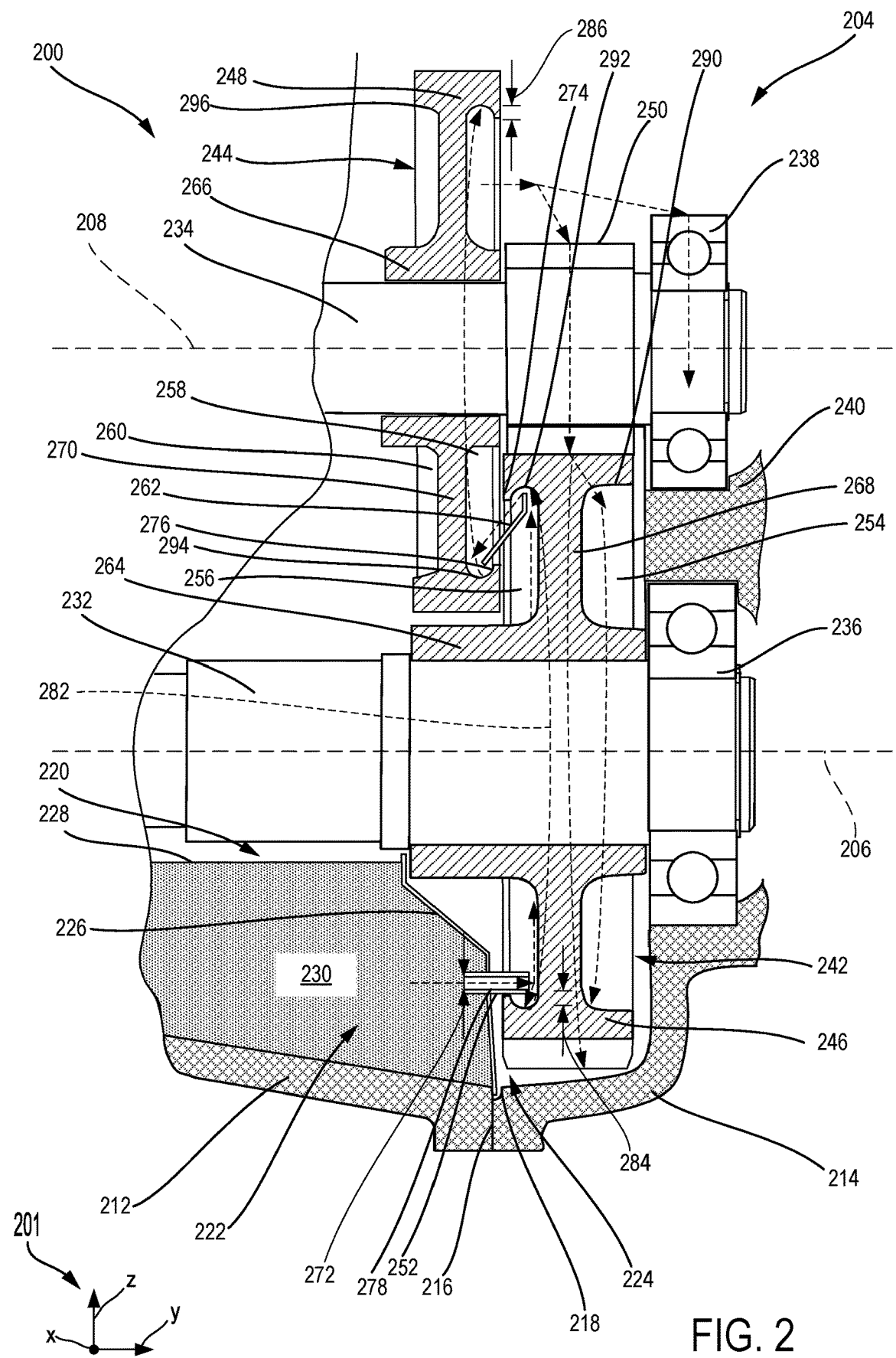
FIG. 2 shows a sectional view illustration of a transmission including a wheel set with a use-case lubrication system.
Figure 3:
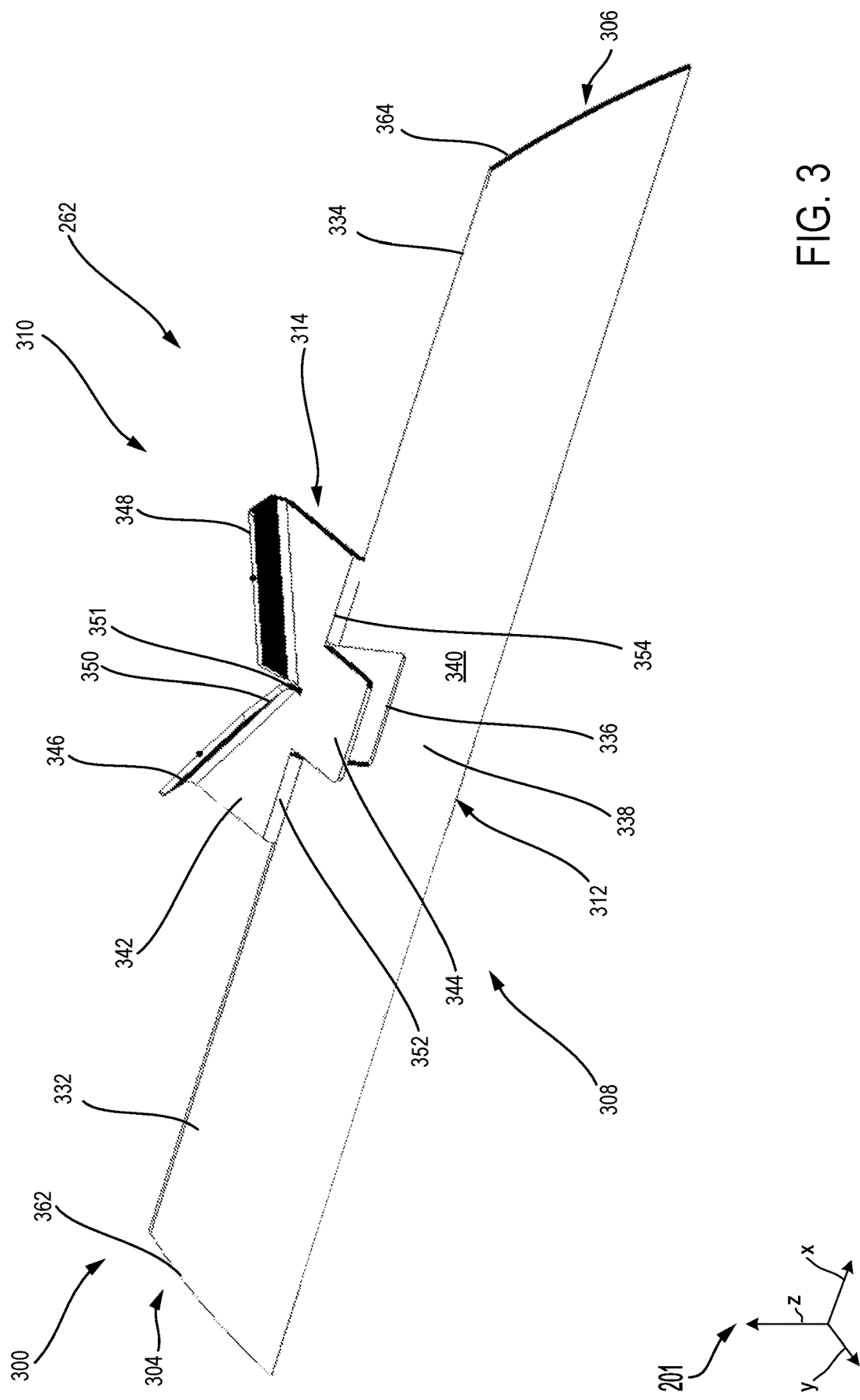
FIG. 3 shows a side view of a use-case baffle.
Figure 4:
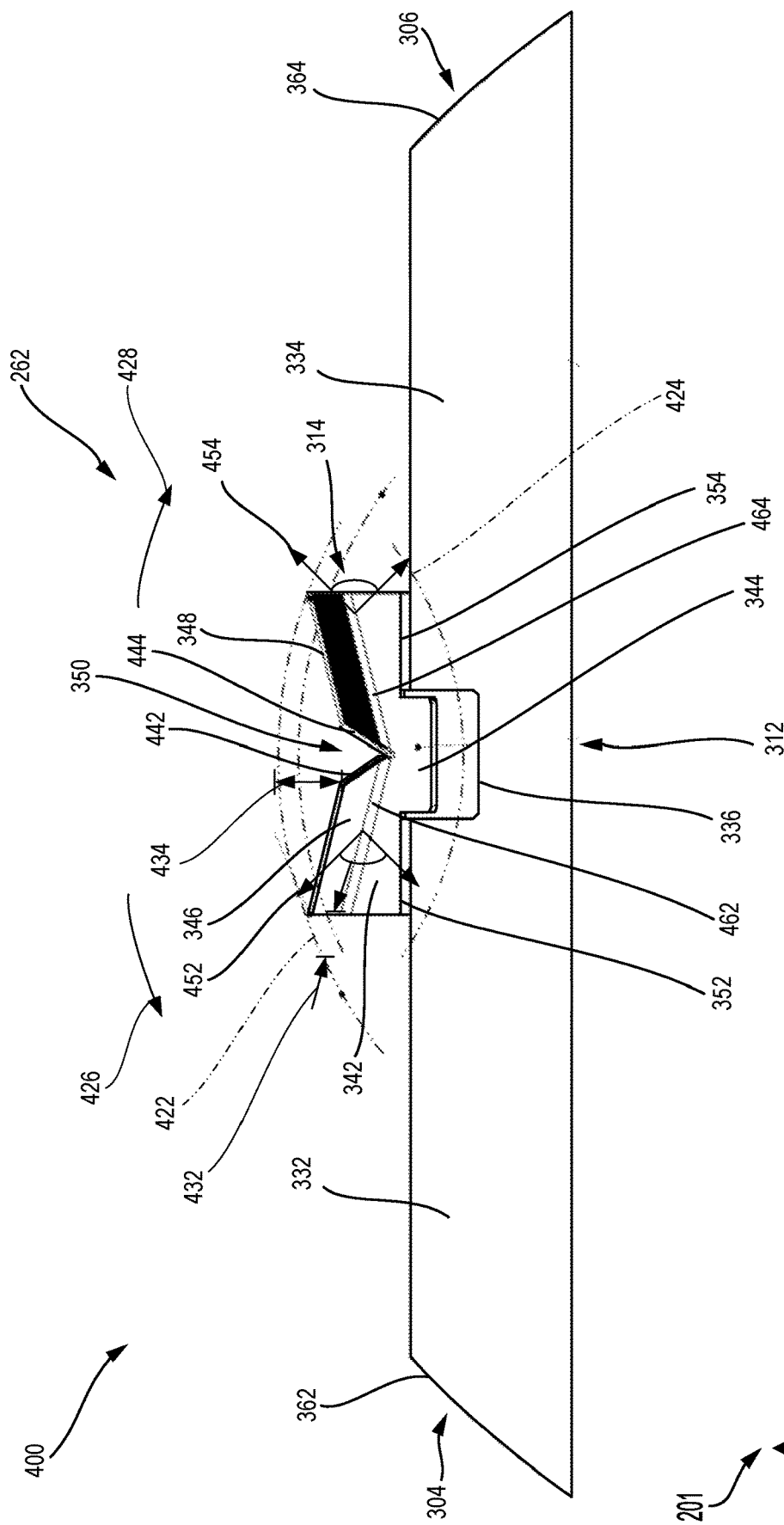
FIG. 4 shows a side view of the use-case baffle.
Figure 5:
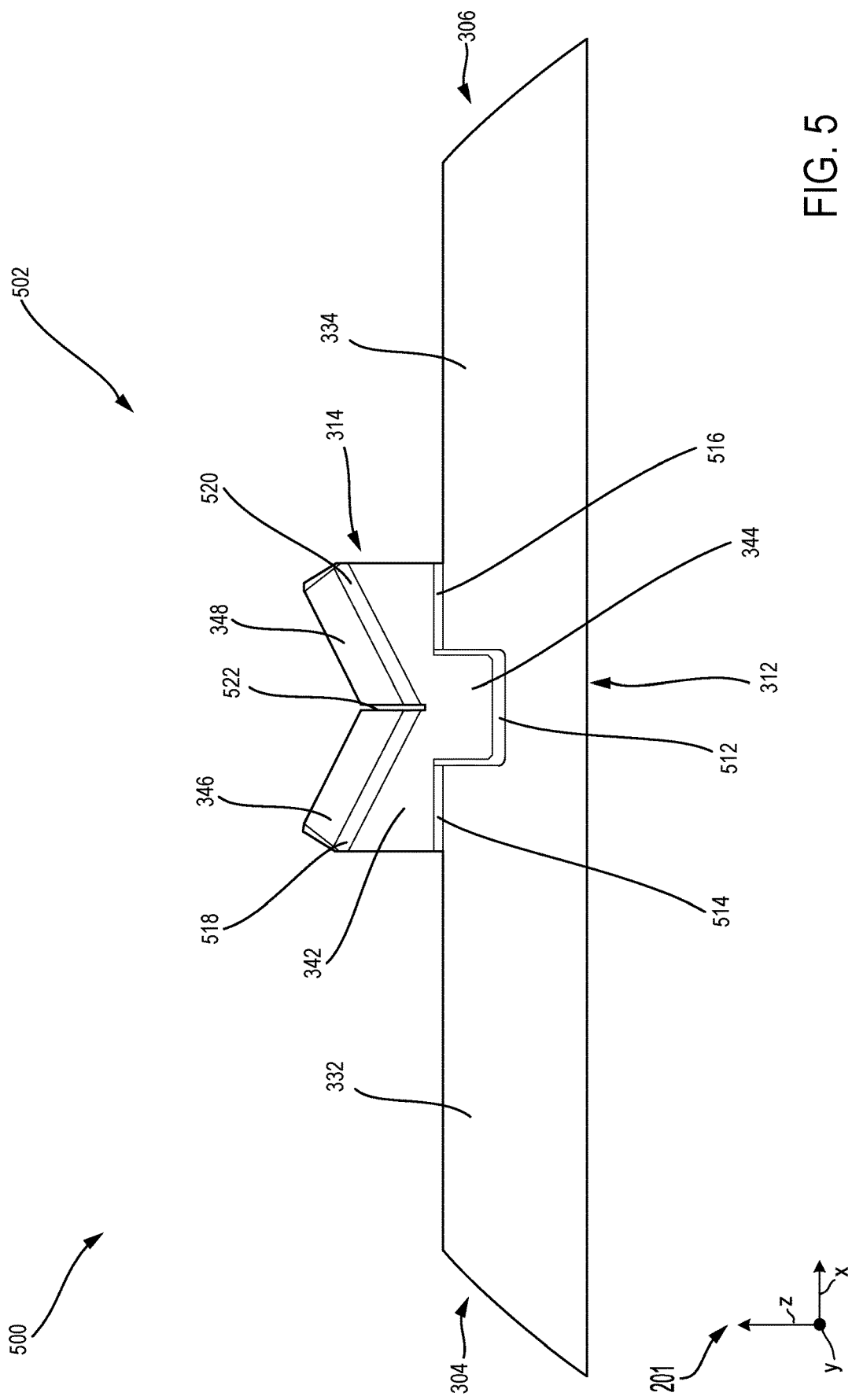
FIG. 5 shows a side view of a use-case baffle before the baffle is stamped.

FIG. 1 shows an example schematic of a vehicle which may include the transmission of the present disclosure. FIG. 2 shows a sectional view illustration of a transmission including a wheel set with a use-case lubrication system. FIG. 3 shows a side view of a use-case baffle. FIG. 4 shows a side view of the use-case baffle. FIG. 4 also shows grooves drawn schematically to which the use-case baffle may fluidly couple. FIG. 5 shows a side view of a use-case baffle before the baffle is stamped. FIG. 5 shows a plurality of stamping sections that may be removed or bent during the stamping of the baffle.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

FIG. 1 show schematics of an example configuration with relative positioning of the various components. FIGS. 2-5 show example configurations with approximate position. FIGS. 2-5 are shown approximately to scale; though other relative dimensions may be used. As used herein, the term "approximately" is construed to mean plus or minus five percent of the range unless otherwise specified.

Further, FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified.

Features described as longitudinal may be approximately parallel with an axis that is longitudinal. A lateral axis may be normal to the longitudinal axis and a vertical axis, and the vertical axis may be normal to the longitudinal axis. Features described as lateral may be approximately parallel with the lateral axis and normal to the longitudinal axis and the vertical axis. Features described as vertical may be parallel with a vertical axis and normal to the longitudinal axis and the lateral axis.

Turning now to FIG. 1, a vehicle 100 is shown comprising a powertrain 101 and a drivetrain 103. The vehicle 100 may have a front end 132 and a rear end 134, located on opposite sides of vehicle 100. Objects, components, and features of the vehicle 100 referred to as being located near the front may be closest to the front end 132 compared to the rear end 134. Objects, components, and features of the vehicle 100 referred to as being located near the rear may be closest to the rear end 134 compared to the front end 132. The powertrain 101 comprises a prime mover 106 and a transmission 108. The prime mover 106 may be an internal combustion engine (ICE) or an electric motor. The prime mover 106 may be operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting. Additionally, there may be other movers in the vehicle besides prime mover 106. If the prime mover 106 is an ICE there may be at least a second mover with an input to the transmission 108, wherein the second mover may be an electric machine such as an electric motor. In one example, if there are a single or plurality of second movers in addition to the prime mover 106, the vehicle 100 may be a hybrid vehicle, wherein there are multiple torque inputs to the transmission 108. The vehicle 100 may have a longitudinal axis 130. The powertrain 101 and drivetrain 103 may have a length parallel with the longitudinal axis 130.

The prime mover 106 may be powered via energy from an energy storage device 105. In one example, the energy storage device 105 is a battery configured to store electrical energy. An inverter 107 may be arranged between the energy storage device 105 and the prime mover 106 and configured to adjust direct current (DC) to alternating current (AC). The inverter 107 may include a variety of components and circuitry with thermal demands that effect an efficiency of the inverter.

The vehicle 100 may be a commercial vehicle, light, medium, or heavy duty vehicle, a passenger vehicle, an off-highway vehicle, and/or sport utility vehicle. Additionally or alternatively, the vehicle 100 and/or one or more of its components may be an industrial, locomotive, military, agricultural, and/or aerospace applications. In one example, the vehicle 100 is an all-electric vehicle or a vehicle with all-electric modes of operation, such as a plug-in hybrid vehicle. As such, the prime mover 106 is an electric machine. In one example, the prime mover 106 is an electric motor/generator.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a rear-wheel drive or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing. The first driveshaft 113 and second driveshaft 122 may be positioned to extend in parallel with the longitudinal axis 130. For an example of a configuration of vehicle 100, the second driveshaft 122 may be centered about the longitudinal axis 130.

The first differential 116 may supply a FWD in some capacity to vehicle 100, as part of rotary power transferred via the first driveshaft 113. Likewise, the second differential 126 may supply a RWD to vehicle 100, as part of the rotary power transferred via the second driveshaft 122. The first differential 116 and the second differential 126 may supply a FWD and RWD, respectively, as part of an AWD mode for vehicle 100.

In some examples, additionally or alternatively, the vehicle 100 may be a hybrid vehicle including both an engine and an electric machine each configured to supply power to one or more of the first axle assembly 102 and the second axle assembly 112. At least one of the engine or electric machine may be the prime mover 106. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

In some embodiments, additionally or alternatively, the transmission 108 may be a first transmission, where the vehicle 100 further comprises a second transmission arranged on the second set of axle shafts 128. Herein, the transmission 108 may be interchangeably referred to as a gearbox.

A set of reference axes 201 are provided for comparison between views shown in FIG. 2-5. The reference axes 201 indicate a y-axis, an x-axis, and a z-axis. In one example, the z-axis may be parallel with a direction of gravity and the x-y plane may be parallel with a horizontal plane that a transmission 204 or a baffle 262 may rest upon. When referencing direction, positive may refer to in the direction of the arrow of the y-axis, x-axis, and z-axis. When referencing direction, negative may refer to in the opposite direction of the arrow of the y-axis, x-axis, and z-axis. A filled circle may represent an arrow and an axis facing toward, or positive to, a view. An unfilled circle may represent an arrow and an axis facing away, or negative to, a view.

Turning to FIG. 2, it shows a first view 200 of a transmission 204. The first view 200 may be a sectional view of the transmission 204. The transmission 204 may be the transmission 108 of FIG. 1.

The transmission 204 may have components, such as shafts and other rotational elements, positioned about a first axis 206 and a second axis 208. The first axis 206 and second axis 208 may be parallel. The second axis 208 may be above the first axis 206 with respect to gravity and the z axis of the reference axes 201. The first axis 206 and the second axis 208 may be longitudinal. The transmission 204 includes a first housing 212 and a second housing 214. The first housing 212 and second housing 214 may physically couple at an interface 216. A notch 218 may be formed between the first housing 212 and the second housing 214, where the notch 218 may be positioned above the interface 216. A sump 220 may be housed by the first housing 212 and second housing 214. The sump 220 may be above the interface 216 and the notch 218. The first housing 212 and second housing 214 may be fixed housing, that may remain stationary relative to the rotational elements of the transmission 204. When physically coupled at the interface 216, the first housing 212 and second housing 214 may form a compound housing that may be a fixed housing.

A barrier, such as a septum 226, may be fit to the notch 218 and may divide the sump 220 into a first reservoir 222 and a second reservoir 224. The septum 226 may be fluid tight with the notch 218, such that first reservoir 222 and second reservoir 224 may be fluidly separated. The septum 226 may have a plurality of sections that extend at different angles. The shape of the first reservoir 222 may be defined by a plurality of inner surfaces of the first housing 212 and the septum 226. Likewise, the shape of the second reservoir 224 may be defined by a plurality of inner surfaces of the first housing 212 and the septum 226.

The first reservoir 222 may be a calm reservoir that houses work fluid 230. The work fluid 230 may be a lubricant, such as oil. As a calm reservoir, the first reservoir 222 may trap work fluid, and the work fluid in the first reservoir 222 may not be churned via mechanical components such as wheels. The first reservoir 222 may have a fluid-free surface 228, where the work fluid 230 is subject to approximately zero parallel sheer stress, such as from turbulating or churning from a moving component of the transmission 204. The second reservoir 224 may be a turbulent reservoir, where the rotational elements may make surface sharing contact with work fluid 230. Rotational elements may be partially housed by the second reservoir 224. Work fluid in the second reservoir 224 may be removed, such as via draining.

The transmission 204 may include a first shaft 232 and a second shaft 234. The first shaft 232 may be centered about the first axis 206, such that the first shaft 232 may be positioned approximately radially about the first axis 206. The second shaft 234 may be centered about the second axis 208, such that the second shaft 234 may be positioned approximately radially about the second axis 208. At least a first bearing 236 may be positioned about and support the first shaft 232. The first bearing 236 may encircle the first shaft 232. Likewise, at least a second bearing 238 may be about and support the second shaft 234. The first bearing 236 may be positioned radially about first shaft 232, and the second bearing 238 may be positioned radially about the second shaft 234. The second bearing 238 may encircle the second shaft 234. One or more fixed supports, such as a fixed support 240, may support the first bearing 236 and second bearing 238. The fixed support 240 may abut and be sandwiched between and abut the first bearing 236 and second bearing 238. The second housing 214 may physically couple to or comprise the fixed support 240.

A first wheel 242 may be positioned about the first shaft 232, such as radially about the first shaft 232. A second wheel 244 may be positioned about the second shaft 234, such as radially about the second shaft 234. The first wheel 242 may rotationally couple to the first shaft 232, such that the first wheel 242 may spin or rotate with the first shaft 232. The second wheel 244 may rotationally couple to the second shaft 234, such that the second wheel 244 may spin or rotate with the second shaft 234. For an example, the first wheel 242 may physically couple to first shaft 232. The second wheel 244 may be positioned above the first wheel 242, therein the second wheel 244 may be an upper wheel relative to the first wheel 242 and the first wheel 242 may be a lower wheel relative to the second wheel 244. The first wheel 242 may be a final drive wheel, such as a final drive gear, and the second wheel 244 may be an intermediate drive wheel, such as an intermediate gear. The first wheel 242 may be partially housed by the second reservoir 224, where the first wheel 242 may be interposed between the septum 226 and the second housing 214. The first reservoir 222 and second reservoir 224 may be in fluid communication via a duct 252. Work fluid 230 may be delivered directly to the first wheel 242 via the duct 252. During rotation of the first wheel 242, work fluid 230 coating surfaces of the first wheel 242 may be flung to coat and lubricate the second reservoir 224 and other rotational elements, such as the first shaft 232 and the first bearing 236. Work fluid 230 may also be transported upward from the first wheel 242 to the second wheel 244. Work fluid 230 coating surfaces of the second wheel 244 may be flung to coat and lubricate other rotational elements, such as the second shaft 234 and the second bearing 238.

In some examples, the first wheel 242 and second wheel 244 may be gears. As gears, the first and second wheels 242, 244 may mesh with other rotational elements of the transmission. When meshed with another component, the first wheel 242 or second wheel 244 may drivingly couple to the other component, such as to transfer energy to and drive the other component. For example, as a gear, the first wheel 242 may mesh with a gear 250. The gear 250 may be a pinion gear of a final drive. The first wheel 242 may be a final drive wheel such as final drive gear. The second shaft 234 may physically couple or comprise the gear 250. The first wheel 242 may therein drive the second shaft 234 via the gear 250.

The first wheel 242 may include a first rim 246, a first groove 254, a second groove 256, a first collar component 264, and a first shoulder 268. The first rim 246 may be positioned about the first shoulder 268, such as radially about the first shoulder 268. The first rim 246 may physically couple to the first shoulder 268. The first rim 246 may be about the first groove 254 and the second groove 256, such as to be radially about the first groove 254 and the second groove 256. The first rim 246 may encircle the first groove 254 and the second groove 256. The first groove 254, the second groove 256, and the first shoulder 268 may be positioned about the first collar component 264, such as to be positioned radially about the first collar component 264. The first groove 254, the second groove 256, and the first shoulder 268 may surround and curve about the first collar component 264, such as to radially surround and radially curve about the first collar component 264. The first shoulder 268 may physically couple the first collar component 264. The first shoulder 268 may extend radially outward from first collar component 264 to the first rim 246. The first shoulder 268 may separate the first groove 254 from the second groove 256, where the first groove 254 may be on the opposite side of the first shoulder 268 from the second groove 256. The first shoulder 268 may be a web of the first wheel 242.

The first groove 254 may be an undercut groove of the first wheel 242, such as a first undercut groove. The second groove 256 is an undercut groove of the first wheel 242, such as a second undercut groove. The first groove 254 and second groove 256 may be radially and circumferentially surrounded by the first rim 246. As an undercut groove, the first groove 254 may have a first surface 290 formed by the first rim 246. Likewise, as an undercut groove, the second groove 256 may have a second surface 292 formed by the first rim 246. The first surface 290 and second surface 292 may curve radially and form the circumference of the first groove 254 and second groove 256, respectively. The first surface 290 may be the deepest part of the first groove 254, where the first surface 290 is the greatest distance of the first groove 254 radially outward from the centerline of the first wheel 242. The second surface 292 may be the deepest part of the second groove 256, where the second surface 292 is the greatest distance of the second groove 256 radially outward from the centerline of the first wheel 242.

The second wheel 244 may have a second rim 248, a third groove 258, a fourth groove 260, second collar component 266, and a second shoulder 270. The second rim 248 may be positioned about the second shoulder 270, such as radially about the second shoulder 270. The second rim 248 may physically couple to the second shoulder 270. The second rim 248 may be positioned about the third groove 258 and the fourth groove 260, such as to be radially about the third groove 258 and the fourth groove 260. The second rim 248 may encircle the third groove 258 and the fourth groove 260. The third groove 258, the fourth groove 260, and the second shoulder 270 may be about the second collar component 266, such as radially about the second collar component 266. The third groove 258, the fourth groove 260, and the second shoulder 270 may surround and curve about the second collar component 266, such as to radially surround and radially curve about the second collar component 266. The second shoulder 270 may physically couple the second collar component 266. The second shoulder 270 may extend radially outward from second collar component 266 to second rim 248. The second shoulder 270 may separate the third groove 258 from the fourth groove 260, where the third groove 258 may be on the opposite side of the second shoulder 270 from the fourth groove 260. The second shoulder 270 may be a web of the second wheel 244.

The third groove 258 is an undercut groove of the second wheel 244, such as a third undercut groove. The fourth groove 260 may be an undercut groove of the second wheel 244, such as a fourth undercut groove. The third groove 258 and fourth groove 260 may be radially and circumferentially surrounded by the second rim 248. As an undercut groove, the third groove 258 may have a third surface 294 formed by the second rim 248. Likewise, as an undercut groove, the third groove 258 may have a fourth surface 296 formed by the first rim 246. The third surface 294 and fourth surface 296 may curve radially and form the circumference of the third groove 258 and fourth groove 260, respectively. The third surface 294 may be the deepest part of the third groove 258, where the third surface 294 is the greatest distance of the third groove 258 radially outward from the centerline of the second wheel 244. The fourth surface 296 may be the deepest part of the fourth groove 260, where the fourth surface 296 is the greatest distance of the fourth groove 260 radially outward from the centerline of the second wheel 244.

In one example a radial profile the second groove 256 and third groove 258 may be U-shaped. Said another way, the second surface 292 of the second groove 256 may form a concave arc when viewed in a radially outward (e.g., away from the first axis 206) direction. Likewise, said another way, the third surface 294 of the third groove 258 may form a concave arc when viewed in a radially outward (e.g., away from the second axis 208) direction.

If the first wheel 242 is a gear, the first rim 246 may include a plurality of first teeth. Likewise, if the second wheel 244 is a gear, the second rim 248 may include a plurality of second teeth. The first teeth and second teeth may extend radially outward from the first rim 246 and second rim 248, respectively. The first teeth and second teeth of the first rim 246 and second rim 248, respectively, may each mesh with complementary teeth or components of another rotational element. For an example, the first teeth of the first rim 246 may mesh with complementary teeth of the gear 250.

The baffle 262 may be interposed between the first wheel 242 and second wheel 244. The baffle 262 may be positioned longitudinally between the first shoulder 268 and the second shoulder 270. The second groove 256 and the third groove 258 may be positioned about portions of the baffle 262. A first portion of the baffle 262 may be positioned below a portion of the second groove 256 nearest to the top of the first wheel 242 (e.g., an upper portion of the second groove 256). A second portion of the baffle 262 may be positioned above a portion of the third groove 258 nearest to the bottom of the second wheel 244 (e.g., a lower portion of the third groove 258). The first portion and second portion of the baffle 262 may be opposite to one another. The first portion may be an uppermost portion of the baffle 262. The second portion may be a lowermost portion of the baffle 262. The second groove 256 may have a first lip 274. The first lip 274 may curve radially inward from the second groove 256. The second surface 292 may be continuous with the first lip 274, and the second surface 292 may be continuous with a surface of first shoulder 268. The first lip 274 and the surface of the first shoulder 268 may have curvatures continuous with the curvature of the second surface 292, and form the U-shape of the second groove 256. The third groove 258 may have a second lip 276, where the second lip 276 may curve with the third groove 258. The second lip 276 may curve radially inward from the third groove 258. The first lip 274 and the second lip 276 may be positioned about portions of the baffle 262. The third surface 294 may be continuous with the second lip 276, and the third surface 294 may be continuous with a surface of second shoulder 270. The second lip 276 and the surface of the second shoulder 270 may have curvatures continuous with the curvature of the third surface 294, and form the U-shape of the third groove 258.

The baffle 262 may be fixed to the transmission 204, such as fixed to a stationary component of the transmission 204. When fixed, the baffle 262 may remain stationary relative to the rotational elements of the transmission 204. The baffle 262 may be fixed to a fixed housing, such as to first housing 212 or the second housing 214. In some examples, the baffle 262 may be fixed to both the first housing 212 and second housing 214, such as when the first housing 212 and second housing 214 are physically coupled as a compound housing. The first wheel 242 and the second wheel 244 may rotate about the baffle 262. The duct 252 may have a diameter 272. The diameter 272 may be an inner diameter of the duct 252, where the diameter 272 is diameter of a passage 278 of the duct 252. Fluid may be transported through the duct 252 via the passage 278. The distance of the diameter 272 may be dependent upon the hydrostatic head of the fluid-free surface 228, such that the duct 252 may lubricate the first wheel 242 with work fluid 230 and minimize power losses below a first threshold of power, such as below 7 kilowatts (kW) of power.

The hydrostatic head and power losses may be dependent on the size and dimensions of the transmission 204, including volume and surface area available to the transmission 204. For a plurality of example embodiments of the first reservoir 222, the fluid-free surface 228 may have a hydrostatic head of a range of hydrostatic heads from 50 to 300 millimeters (mm). For an example embodiment, the transmission 204 generate a nominal power of 100 kW, where the power losses at full speed without the first reservoir 222, the septum 226, and the duct 252 (e.g., pure splashing) may be 7 kW or above. When the first reservoir 222, the septum 226, and the duct 252 are implemented and when the second reservoir 224 is emptied or has a fluid height not in contact with the first wheel 242, the power losses a full speed can be reduced at roughly 1 kW.

Work fluid 230 may leave the first reservoir 222 along a flow path 282. The flow path 282 may be represented schematically by a plurality of dashed lines with arrows. Work fluid 230 may exit the first reservoir 222 and be directed to the first wheel 242 via the duct 252. Work fluid 230 from the duct 252 may be deposited on the surfaces of the second groove 256. The first wheel 242 may rotate, such as when torque is input to the first wheel 242 via the first shaft 232. The rotation of the first wheel 242 may spread work fluid 230 about the surfaces of the second groove 256 and the first shoulder 268. Forces from rotation of the first wheel 242, such as centripetal force, may drive work fluid radially outward, such as closer to the first rim 246 from the first collar component 264. Work fluid 230 may be prevented from splashing out of the second groove 256 via the first lip 274. Work fluid may collect between the first lip 274 and the first shoulder 268. The baffle 262 may transport work fluid between the first wheel 242 and the second wheel 244. The baffle 262 may collect work fluid 230 at the upper portion of the second groove 256, such as via scraping. Work fluid 230 collected by the baffle 262 may be driven in a downward direction by passive forces, such as via gravity and adhesion. Work fluid 230 collected by the baffle 262 may also be driven in a downward direction via a second momentum of work fluid 230. The second momentum of the work fluid 230 is deviated from a first momentum of work fluid 230, where the first momentum of work fluid 230 is centripetal force of the first wheel 242. The second momentum is carried and deviated from the first momentum of work fluid 230 via the shape and features of the baffle 262. The shape and features of the baffle 262 may direct the work fluid 230 from the first wheel 242 to the second wheel 244 via the second momentum of work fluid 230 without forces from gravity or adhesion. The baffle 262 may passively direct work fluid 230 collected from the second groove 256 to the third groove 258. Work fluid 230 may be deposited on surfaces of the third groove 258 via the baffle 262.

Flow path 282 may continue through the second wheel 244. The second wheel 244 may rotate, such as when torque is input to the second wheel 244 via the second shaft 234. The rotation of the second wheel 244 may spread work fluid 230 about the surfaces of the third groove 258 and the second shoulder 270. Forces from rotation of the second wheel 244, such as centripetal force, may drive work fluid radially outward, such as closer to the second rim 248 from the second collar component 266. Work fluid 230 may be prevented from splashing out of the third groove 258 via the second lip 276. Work fluid 230 may collect between the second shoulder 270 and the second lip 276. Work fluid 230 may leave the third groove 258, such as via splashing or dripping. Work fluid 230 may leave the third groove 258 when the height of the work fluid 230 increases above a second height 286 of the second lip 276. Returning to the second groove 256, work fluid 230 may leave the second groove 256, such as via splashing, when the height of the work fluid 230 increases above a first height 284 of the first lip 274. Work fluid 230 that leaves the uppermost part of the third groove 258 (e.g., nearest to the top of the second rim 248) may be at a height 287 above axis 208. Height 287 is a great enough distance above components coupled to the second axis 208, such as the second shaft 234, the second bearing 238, and gear 250, may be lubricated via gravity. Components of the transmission 204 below the uppermost part of the third groove 258 may be lubricated via work fluid 230 from the uppermost part of the third groove 258 and gravity.

Flow path 282 may continue after exiting third groove 258 and the second wheel 244. Upon exiting the second wheel 244, work fluid 230 may be splashed or dripped onto the second shaft 234. Likewise, work fluid 230 may be splashed or dripped from the second wheel 244 to components about the and/or coupled to the second shaft 234, such as the second bearing 238 and the gear 250. The work fluid 230 may lubricate the second shaft 234, second bearing 238, and the gear 250. Work fluid 230 may drip or be splashed from the second shaft 234 to components positioned below the second shaft 234. For example, work fluid 230 may be splashed or dripped from the second shaft 234 to the first wheel 242. Additionally, work fluid 230 may be splashed from the gear 250 to the first wheel 242, or carried from the gear 250 to the first wheel 242 via meshing. Work fluid from the second wheel 244, second shaft 234, and/or the gear 250 may coat and lubricate features of the first wheel 242, such as the first rim 246. Work fluid 230 may be flung from the first rim 246 to the second reservoir 224.

The septum 226 may bend, where a plurality of sections of the septum 226 extend at differing angles from a line at the interface. The sections of the septum 226 may bend about a rotational element or a plurality rotational elements. The dimensions of the septum 226 may be non-limiting and may be shaped to be positioned about and give the second reservoir 224 packing space to accommodate different configurations of rotational elements.

It is to be appreciated that there may be additional wheels besides the first wheel and second wheel and additional baffles of the configuration of the baffle 262 in transmission 204. Each additional baffle sharing the configuration of the baffle 262 may be positioned interposed between a lower wheel and an upper wheel, where the upper wheel is positioned above the lower wheel. A baffle sharing the configuration of the baffle 262 may fluidly couple the lower wheel to the upper wheel, such that fluid from a groove of the lower wheel may be transported via the baffle to a groove of the upper wheel. For example, there may be a third wheel positioned above the second wheel 244. The baffle 262 or a baffle of sharing the same configuration may be positioned between the second wheel and third wheel. A groove of the second wheel 244, such as the third groove 258, and a groove of the third wheel may be positioned about opposite sides of the baffle 262. The first portion of the baffle 262 may be positioned below the top portion of the groove of the second wheel 244. The second portion of the baffle 262 may be positioned above the bottom portion of the groove. The baffle may collect fluid from the groove of the second wheel 244. The baffle may distribute the collected fluid to the groove of the third wheel.

Turning to FIG. 3, it shows a second view 300 of the baffle 262. The second view 300 may be a side view of the baffle 262, where the second view 300 does not favor (e.g., is not normal to) an axis of the reference axes 201. The second view 300 may alternatively be described as an isometric view. The baffle 262 may have a first side 304, a second side 306, a third side 308, and a fourth side 310. The first side 304 and second side 306 may be opposite to one another. The third side 308 and fourth side 310 may be opposite to one another.

The baffle 262 may include a wing assembly 312 and a deflector assembly 314. The baffle 262 may be a singular and unitary structure. The wing assembly 312 and deflector assembly 314 as may be molded of and folded from a common structure of the same material. For an example, the baffle 262 may be manufactured via stamping. The wing assembly 312 and the deflector assembly 314 may be formed via stamping.

The wing assembly 312 may fix the baffle 262 to a stationary component of the transmission 204 of FIG. 3, such as the first or second housings 212, 214. The wing assembly 312 may include at least a pair of wings, such as a first wing 332 and a second wing 334. The first wing 332 may extend toward the first side 304, where a portion of the first wing 332 is included by the first side 304. The second wing 334 may extend toward the second side 306, where a portion of the second wing 334 is included by the second side 306. The wing assembly 312 may have faces on the third side 308 and the fourth side 310. The wing assembly 312 may have a first face 340 on the third side 308. The wing assembly 312 may have a gap 336. The gap 336 may be a volume may be centered between the first wing 332 and the second wing 334. The gap 336 may be above a beam 338. The first wing 332 may be continuous with the second wing 334 via the beam 338. The first face 340 may be continuous on the first wing 332, the second wing 334, and the beam 338.

The deflector assembly 314 may include a slope 342 and a plurality of appendages, where the slope 342 may support and be connected to the plurality of appendages. The deflector assembly 314 may include the first portion (e.g., the uppermost portion) and the second portion (e.g., the lowermost portion) of the baffle 262, where the first portion and second portion of the baffle 262 are described above with respect to FIG. 2. The first portion of the baffle 262 may include a plurality of appendages connected to the slope 342, where the appendages may be encircled by a groove and interposed between a lip and a shoulder of the groove. The groove may be the second groove 256, and the lip and shoulder may be the first lip 274 and the first shoulder 268 of FIG. 2, respectively. The slope 342 may be a platform that may be level and parallel with a plane. The appendages may be connected to the slope 342, and the appendages may include plurality of deflectors and at least a lip. For example, the slope 342 may be level with and continuous with a lip 344. The lip 344 may be a first appendage extending away from the slope. The second portion of the baffle 262 with may include the lip 344. The slope 342 and the lip 344 may be level, such that the slope 342 and lip 344 may have an area parallel with a common plane. The slope 342 and lip 344 may be continuous, such as to share at least a continuous surface. The lip 344 may extend toward the third side 308 and the other portions of the slope 342 may extend toward the fourth side 310. The slope 342 may connect to both a first deflector 346 and a second deflector 348. The first deflector 346 and second deflector 348 may be a second appendage and third appendage, respectively, contiguous with and connected to the slope 342. The first portion of the baffle 262 includes the first deflector 346 and second deflector 348. The first and second deflectors 346, 348 may be flat and planar structures, such as fins. The first deflector 346 may be a first fin and the second deflector 348 may be a second fin. The first deflector 346 and second deflector 348 may have edges and corners that are not beveled, rounded, or smoothed. The first deflector 346 and second deflector 348 may be positioned above and extend upward from the slope 342. A wedge 350 may separate the first deflector 346 from the second deflector 348. The wedge 350 may be a volume between the first and second deflectors 346, 348 and may be angular in shape. The volume of the wedge 350 may be continuous with a groove 351. The groove 351 may be a volume that depresses through the slope 342 and may extends toward the third side 308 from the fourth side 310. The deflector assembly 314 may be a singular and unitary structure, wherein the slope 342, the lip 344, the first deflector 346, and the second deflector 348 may be molded of and folded from the same material.

The deflector assembly 314 may be connected to and contiguous with the wing assembly 312 via a first connector 352 and a second connector 354 about the first wing and second wing, respectively. The first connector 352 and the second connector 354 may flank the gap 336 on opposite sides. The first connector 352 may be closest to the first side 304 from the gap 336. The second connector 354 may be closest to the second side 306 from the gap 336.

The first wing 332 may have a first edge 362 and the second wing 334 may have a second edge 364. The first edge 362 is at the first side 304 and the second edge 364 is at the second side 306. The first edge 362 and second edge 364 may curve about the first wing 332 and the second wing 334, respectively. The first edge 362 and the second edge 364 may each be fit to or mate with complementary features, such as grooves or slots, of a transmission, such as the transmission 204. The first edge 362 and second edge 364 may be fit to features that are stationary (e.g., fixed) relative to the rotational elements of the transmission. For example, the first edge 362 may be fit to a first complementary feature and the second edge 364 may be fit to a second complementary feature of the transmission 204. The first complementary feature and the second complementary feature may be physically couple to or be included as a part of stationary housing, such as the first housing 212 and/or second housing 214 of FIG. 2. When received by and fit to the first complementary feature and the second complementary feature, the first edge 362 and second edge 364 may be fix the baffle 262 to the transmission 204. The first edge 362 may be fit to the first complementary feature via a snap fit or a snap in. Likewise, the second edge 364 may be fit to the second complementary feature via a snap fit or a snap in. The first and second complementary features may be features of the same housing, such as the first housing 212 or second housing 214.

Turning to FIG. 4, it shows a third view 400 of the baffle 262. The third view 400 may be a side view of the baffle 262. The third view 400 is a longitudinal view, that normal to the y axis of the reference axes 201. The third view 400 schematically shows a first groove 422 and a second groove 424.

The first groove 422 may be a groove positioned such that the first and second deflectors 346, 348, may collect work fluid, such as work fluid 230 of FIG. 2. Work fluid may collect on the slope 342 from the first and second deflectors 346, 348. The second groove 424 may be a groove that may be positioned to receive work fluid from the deflector assembly 314. Work fluid may be distributed to the second groove 424 via the lip 344. The first and second grooves 422, 424 are each undercut grooves of separate wheels. The first groove 422 may be the second groove 256 of FIG. 2. The second groove 424 may be the third groove 258 of FIG. 2.

The first groove 422 may rotate in a first direction 426 or a second direction 428. The first direction 426 may be counter clockwise and the second direction 428 may be clockwise. The first deflector 346 may collect fluid from the first groove 422, such as when the first groove 422 rotates in the first direction 426. The second deflector 348 may collect fluid from the first groove 422, such as when the first groove 422 rotates in the second direction 428.

The first groove 422 may be separated from the deflector assembly 314 by a first distance 432 and a second distance 434. The first distance 432 may be a minimum distance between the first groove 422 and each of the first and second deflectors 346, 348. The second distance 434 may be a maximum distance between the first groove 422 and each of the first and second deflectors 346, 348. The first distance 432 may be a clearance allowing for the first and second deflectors 346, 348 to collect fluid without making contact with a surface of the first groove 422. The first distance 432 may also be a distance between a surface of the first groove 422 and the first and second deflectors 346, 348, where the surface is where the undercut of the first groove 422 is the deepest. When first groove 422 is the second groove 256, the first distance 432 is a distance between the second surface 292 of FIG. 2 and the first and second deflectors 346, 348. The second distance 434 may be between a first edge 442 of the first deflector 346 and the first groove 422. The second distance 434 may be between a second edge 444 of the second deflector 348 and the first groove 422. The first edge 442 and second edge 444 may be on opposite side of the wedge 350. The first edge 442 and the second edge 444 may not be curved and may extend in a linearly from the groove 351 to the top of the first and second deflectors 346, 348, respectively. The first deflector 346 may extend at first angle 452 from the slope 342. Likewise, the second deflector 348 may extend at a second angle 454 from the slope 342. The first angle 452 and the second angle 454 may be approximately equal in dimensions. For an example of an embodiment of the baffle 262, the first angle 452 and the second angle 454 may include a range of angle between 0 and 90 degrees.

The first deflector 346 and the second deflector 348 may be bent from and contiguous with the slope 342 via a third connector 462 and a fourth connector 464. The third connector 462 may extend from the slope at a third angle 466, where the third angle 466 may be a different angle from the first angle 452. The fourth connector 464 may extend from the slope at a fourth angle 468, where the fourth angle 468 may be a different angle from the second angle 454. The third angle 466 and the fourth angle 468 may be between 0 and 90 degrees. Likewise, the third angle 466 and the fourth angle 468 may be equal in dimensions.

If the first groove 422 is the second groove 256, the first and second deflectors 346, 348 may be positioned below the second surface 292 of FIG. 2 near the top of the first wheel 242. The first and second deflectors 346, 348 may be interposed between the first lip 274 and the first shoulder 268 of FIG. 2. If the second groove 424 is the third groove 258, the lip 344 may be positioned above the third surface 294 near the bottom of the second wheel 244. The lip 344 may be interposed between the second lip 276 and the second shoulder 270.

Turning to FIG. 5 it shows a fourth view 500 of the baffle 502. The fourth view 500 may be a side view of the baffle 502. The fourth view 500 is a longitudinal view, that normal to the y axis of the reference axes 201. Baffle 502 may be baffle 262 of FIGS. 2-4 before stamping.

The baffle 262 may have a first stamping section 512, a second stamping section 514, a third stamping section 516, a fourth stamping section 518, and a fifth stamping section 520. The baffle 502 may include a slit 522 sandwiched between the first deflector 346 and the second deflector 348. Before stamping, all components of the baffle 502 may rest upon the same plane. Before stamping baffle 502, wing assembly 312 and the deflector assembly 314 may each have areas that are parallel with a plane formed by the x and y axes of the reference axes 201. Before stamping the baffle 502, first deflector 346 and second deflector 348 may be level to and have areas parallel with the slope 342.

The first stamping section 512 may form the gap 336 when stamped and removed from the baffle 262. The first stamping section 512 may be disconnected and removed from the wing assembly 312 and the lip 344. The second stamping section 514 and third stamping section 516 may form the gap 336 when stamped and pressed. The second stamping section 514 may be stamped and bent into the first connector 352 of FIG. 3. The third stamping section 516 may be stamped and bent into the second connector 354 of FIG. 3. The first deflector 346 and the second deflector 348 may bend at the fourth stamping section 518 and fifth stamping section 520, respectively. The first deflector 346 and the second deflector 348 may bend at the fourth stamping section 518 and fifth stamping section 520, respectively, away from the slope 342. The slit 522 may be expanding into the wedge 350 of FIGS. 3-4, such as when the first and second deflectors 346, 348 are bent at the fourth and fifth stamping sections 518, 520, respectively. The fourth stamping section 518 may be bent via stamping into the third connector 462. The fifth stamping section 520 may be bent via stamping into the fourth connector 464.

In this way, a baffle may collect fluid from a lower wheel and passively deposit the fluid to an upper wheel. The baffle is stationary and fixed to a feature of a transmission, such as the fixed housing. The baffle may have a wing assembly and a deflector assembly, where the wing assembly may fix the baffle to a feature and the deflector assembly may collect fluid from the lower wheel. The deflector section may also distribute fluid to the upper wheel after collection. The deflector section has a platform that supports a plurality of appendages, where at least a first appendage may distribute fluid to the upper wheel and a pair of appendages may collect fluid from features of the lower wheel. Each of the lower wheel and the upper wheel have at least an undercut groove, where the groove of upper wheel and lower wheel may collect fluid. Fluid collected in a first of the lower wheel may collected by the deflector section. Fluid collected by the deflector section may be distributed to a second groove of the upper wheel.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of prime movers, internal combustion engines, and/or transmissions. The subject matter of the present disclosure includes all novel and non-obvious combinations and sub-combinations of the various systems and configurations, and other features, functions, and/or properties disclosed herein.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A gearbox including:
a fixed housing;
a first wheel housed in the fixed housing;
a second wheel housed in the fixed housing;
a duct, where the duct is fixed to the gearbox; and
a baffle interposed between the first wheel and the second wheel,
where the duct is configured to transport a fluid to the first wheel, where the baffle is configured to transport fluid from the first wheel to the second wheel, and where the baffle is fixed to the fixed housing, and where the first wheel has a first undercut groove and the second wheel has a second undercut groove.

2. The gearbox of claim 1, where the duct is configured to transport fluid to the first undercut groove.

3. The gearbox of claim 2, where the baffle is configured to transport fluid from the first undercut groove to the second undercut groove.

4. The gearbox of claim 3, where the fixed housing is configured to include a calm reservoir and a turbulent reservoir, where the calm reservoir and the turbulent reservoir are separated via a septum fixed to the fixed housing, where the duct fluidly couples the calm reservoir to turbulent reservoir, where the duct is fixed to the septum, where the first wheel is housed in the turbulent reservoir.

5. The gearbox of claim 3, where the first wheel rotationally couples to a first shaft and the second wheel rotationally couples to a second shaft.

6. The gearbox of claim 3, where the baffle includes a plurality of appendages configured to collect lubricant from the first undercut groove.

7. The gearbox of claim 6, where the baffle has an uppermost portion that includes the plurality of appendages, where the uppermost portion is encircled by the first undercut groove, where the uppermost portion is interposed between a lip and a shoulder of the first undercut groove.

8. The gearbox of claim 7, where the baffle includes a first appendage configured to distribute lubricant from the baffle to the second undercut groove.

9. The gearbox of claim 8, where the baffle further includes a second appendage and a third appendage, where the second appendage and third appendage are part of the uppermost portion, wherein the second appendage collects lubricant from the first undercut groove when the first wheel rotates in a first direction, and the third appendage collects lubricant from the first undercut groove when the first wheel rotates in a second direction.

10. The gearbox of claim 6, where the baffle has a wing assembly of at least a first wing and a second wing, where the wing assembly physically couples and fixes the baffle to the fixed housing.

11. The gearbox of claim 10, where the wing assembly is fixed to the fixed housing via a snap fit, where the first wing snaps to the fixed housing and the second wing snaps to the fixed housing.

12. The gearbox of claim 1, where the first wheel is a first gear and the second wheel is a second gear.

13. A baffle including:
a platform;
a first appendage that shares a continuous surface with the platform;
a first fin that extends at a first angle above the platform;
a second fin that extends at a second angle above the platform; and
a wing assembly including a first wing and a second wing;
wherein the baffle is interposed between a first wheel and a second wheel, the first wing and second wing have curved edges, and the baffle is configured to transport fluid from an undercut groove of the first wheel to the second wheel, wherein the first fin and the second fin are configured to collect fluid from the undercut groove, the first appendage is configured to distribute fluid from the baffle to the second wheel, and the baffle is fixed to a fixed housing via the wing assembly.

14. The baffle of claim 13, where an uppermost portion of the baffle that includes the first fin and the second fin is encircled by the undercut groove, where the uppermost portion of the baffle is interposed between a lip and a shoulder of the undercut groove.

15. The baffle of claim 14, where the first fin and the second fin are contiguous with the platform via a first connector and second connector, respectively, where the first connector and second connector extend from the platform at a third angle and a fourth angle, respectively, and the third angle and fourth angle equal to each other, where the first angle and the second angle are equal to each other, where the first angle is not equal to the third angle and the second angle is not equal to the fourth angle.

16. The baffle of claim 15, where the first fin and second fin are separated via a wedge, wherein the wedge is flanked by a first edge of the first fin and a second edge of the second fin.

* * * * *